(12) United States Patent
Hwang et al.

(10) Patent No.: US 8,389,162 B2
(45) Date of Patent: Mar. 5, 2013

(54) ELECTROLYTE FOR RECHARGEABLE LITHIUM BATTERY INCLUDING ADDITIVES, AND RECHARGEABLE LITHIUM BATTERY INCLUDING THE SAME

(75) Inventors: Duck-Chul Hwang, Suwon-si (KR); Sang-Min Lee, Suwon-si (KR); Kyoung-Han Yew, Suwon-si (KR); Sang-Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 657 days.

(21) Appl. No.: 12/560,351

(22) Filed: Sep. 15, 2009

(65) Prior Publication Data

US 2010/0255369 A1     Oct. 7, 2010

(30) Foreign Application Priority Data

Apr. 1, 2009  (KR) ........................ 10-2009-0028104

(51) Int. Cl.
*H01M 6/18* (2006.01)

(52) U.S. Cl. ........ 429/307; 429/330; 429/339; 429/340; 429/328; 429/231.1; 429/231.2; 429/231.3; 429/231.5; 252/62.2

(58) Field of Classification Search .................. 429/307, 429/330, 339, 340, 328, 231.1, 231.2, 231.3, 429/231.5; 252/62.2
See application file for complete search history.

(56) References Cited

U.S. PATENT DOCUMENTS

| | | | |
|---|---|---|---|
| 2004/0013946 A1 | 1/2004 | Abe et al. | |
| 2006/0228626 A1 | 10/2006 | Kawashima et al. | |
| 2008/0220336 A1 | 9/2008 | Mun et al. | |
| 2009/0142663 A1 | 6/2009 | Takeuchi et al. | |
| 2009/0253045 A1 | 10/2009 | Kotato et al. | |

FOREIGN PATENT DOCUMENTS

| | | |
|---|---|---|
| EP | 1276165 A1 | 1/2003 |
| JP | 07-176322 | 7/1995 |
| JP | 2003-151623 | 5/2003 |
| JP | 2006-173099 | 6/2006 |
| JP | 2007-053083 | 3/2007 |
| JP | 2007-538365 | 12/2007 |
| JP | 2008-010414 | 1/2008 |
| JP | 2008-108586 | 5/2008 |
| JP | 2009-501419 | 1/2009 |
| JP | 2011-519133 | 6/2011 |
| KR | 10-2004-0010189 A | 1/2004 |
| KR | 10-2006-0114919 A | 11/2006 |
| KR | 1020060114919 A | 11/2006 |
| KR | 1020070024663 A | 3/2007 |
| KR | 1020070089958 A | 9/2007 |
| KR | 10-2008-0031151 A | 4/2008 |
| KR | 1020080082276 A | 9/2008 |
| KR | 10-2009-0006691 A | 1/2009 |
| KR | 10-2009-0015090 A | 2/2009 |
| KR | 10-2009-0039196 A | 4/2009 |
| KR | 2009-0039196 A * | 4/2012 |
| WO | WO 2007/094625 A1 | 8/2007 |
| WO | WO 2007/142121 A1 | 12/2007 |
| WO | WO 2009/131419 A | 10/2009 |

OTHER PUBLICATIONS

KIPO Notice of Allowance issued Jul. 26, 2011 for Korean Application No. 10-2009-0028104 (5 pages).
EPO Search Report issued in Application No. 09168334 on Aug. 1, 2011 (10 pages).
KIPO Office action, dated Nov. 16, 2010, for corresponding Korean Patent Application No. 10-2009-0039196 A.
SIPO Office action dated Mar. 22, 2012, for corresponding Chinese Patent application 200910177616.5, with English translation (11 pages).
Japanese Office action dated Jul. 3, 2012, for corresponding Japanese Patent application 2009-206230, (3 pages).
Patent Abstracts of Japan, and English machine translation of Japanese Publication 07-176322 listed above, (5 pages).
Patent Abstracts of Japan, and English machine translation of Japanese Publication 2007-053083 listed above, (34 pages).
SIPO Decision of Rejection dated Sep. 26, 2012, for corresponding Chinese Patent application 20091017761635, with English translation, (11 pages).

\* cited by examiner

*Primary Examiner* — Laura Weiner
(74) *Attorney, Agent, or Firm* — Christie, Parker & Hale, LLP

(57) ABSTRACT

An electrolyte for a rechargeable lithium battery that includes a non-aqueous organic solvent, a lithium salt, and an electrolyte additive. The electrolyte additive includes 2 to 6 wt % of succinonitrile, 2 to 6 wt % of alkane sultone, and 1 to 3 wt % of vinylethylene carbonate based on the total weight of the electrolyte.

10 Claims, 1 Drawing Sheet

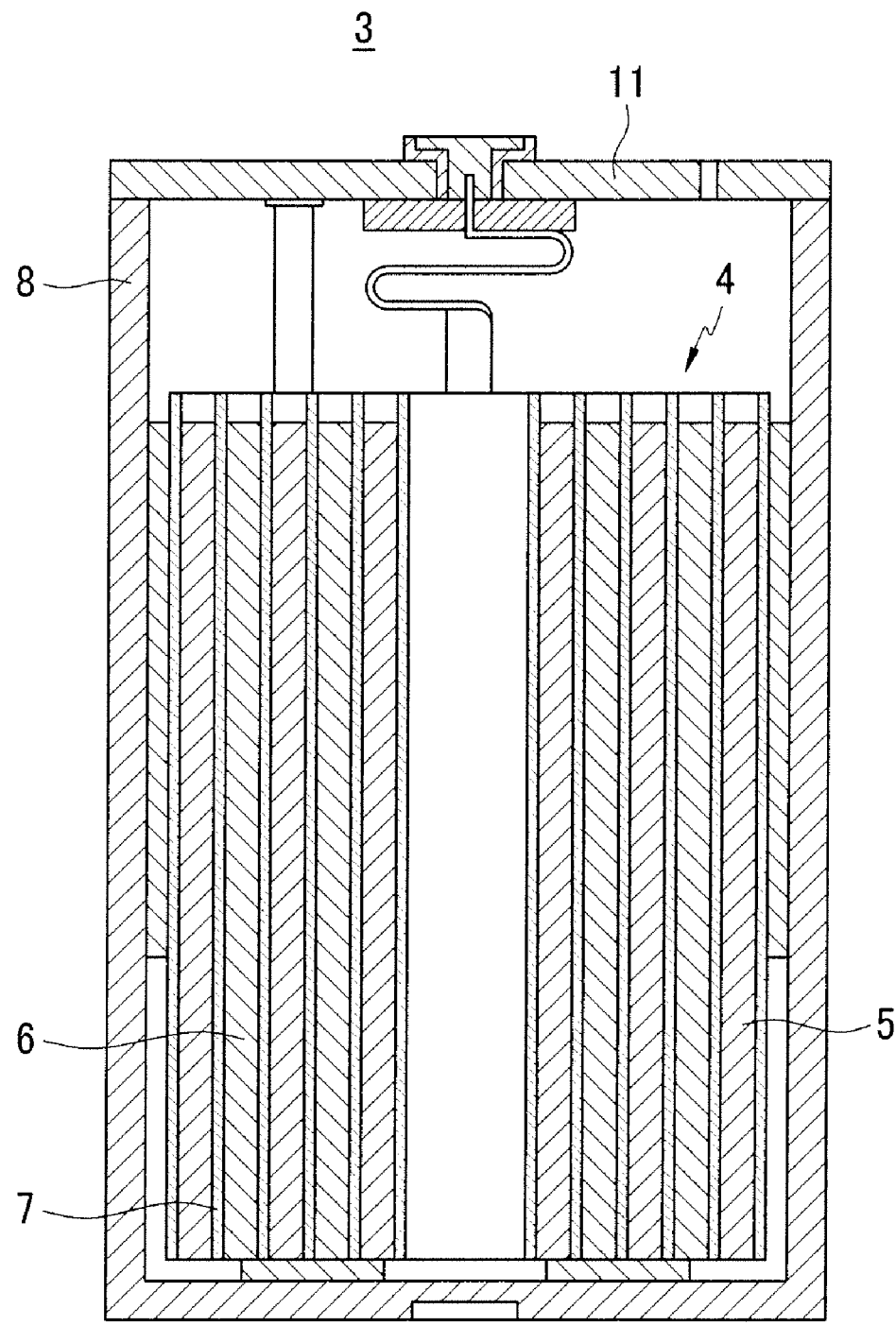

ELECTROLYTE FOR RECHARGEABLE LITHIUM BATTERY INCLUDING ADDITIVES, AND RECHARGEABLE LITHIUM BATTERY INCLUDING THE SAME

RELATED APPLICATIONS

This application claims priority to and the benefit of Korean Patent Application No. 10-2009-0028104, filed in the Korean Intellectual Property Office, on Apr. 1, 2009, the entire content of which is incorporated herein by reference.

BACKGROUND

1. Field

This disclosure relates to an electrolyte for a rechargeable lithium battery including an additive and a rechargeable lithium battery including the same.

2. Description of the Related Art

Lithium rechargeable batteries have recently drawn attention as a power source of small portable electronic devices. They use an organic electrolyte solution and thereby have twice the discharge voltage of a conventional battery using an alkali aqueous solution, and accordingly have high energy density.

As for negative active materials of a rechargeable lithium battery, various carbon-based materials such as artificial graphite, natural graphite, and hard carbon, which can all intercalate and deintercalate lithium ions, have been used.

For positive active materials of a rechargeable lithium battery, chalcogenide compounds that are composite metal oxides such as $LiCoO_2$, $LiMn_2O_4$, $LiNiO_2$, $LiNi_{1-x}Co_xO_2$ ($0<x<1$), $LiMnO_2$, and the like have been researched.

For an electrolyte, a lithium salt dissolved in a non-aqueous solvent including ethylene carbonate, dimethyl carbonate, diethyl carbonate, and the like has been used.

During the initial charge of a rechargeable lithium battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, $LiO$, $LiOH$, etc., thereby forming a thin film on the surface of the negative electrode. This film is referred to as an organic solid electrolyte interface (SEI) film. The organic SEI film formed during the initial charge not only blocks (or prevents) the reaction between lithium ions and the carbon negative electrode or other materials during charging and discharging, but it also acts as an ion tunnel, allowing the passage of only lithium ions. The ion tunnel blocks (or prevents) the disintegration of the structure of the carbon negative electrode, which causes organic solvents in an electrolyte with a high molecular weight to make solvate lithium ions, and the solvent and the solvated lithium ions co-intercalate into the carbon negative electrode. Once the organic SEI film is formed, lithium ions do not again react with the carbon electrode or other materials such that an amount of lithium ions is reversibly maintained.

However, problems may occur in which gases are generated inside the battery using carbonate-based organic solvents due to decomposition of a carbonate based organic solvent during the organic SEI film-forming reaction. These gases include $H_2$, $CO$, $CO_2$, $CH_4$, $C_2H_6$, $C_3H_8$, $C_3H_6$, etc. depending on the type of non-aqueous solvent and negative active material used. Due to gas generation inside the battery, battery may be expanded during charge. In addition, a SEI film is slowly disintegrated by electrochemical energy and heat energy, which increase with the passage of time when the fully charged battery is stored at high temperatures after it is charged, for example, if it is stored at 85° C. for four days after a 100% charge at 4.2 V. Accordingly, a side reaction in which an exposed surface of the negative electrode reacts with surrounding electrolytes occurs continuously to generate gases. The internal pressure of the battery increases with this generation of gases.

Therefore, there is a need to develop an electrolyte additive to suppress an internal pressure increase by preventing or reducing this generation of gases during SEI film-forming reactions, and also to improve capacity retention at a high temperature.

SUMMARY

An aspect of the present invention is directed toward an electrolyte for a rechargeable lithium battery having a high voltage, and excellent storage characteristics at high temperature.

An aspect of the present invention is directed toward a rechargeable lithium battery including the electrolyte for a rechargeable lithium battery.

According to an embodiment of the present invention, an electrolyte for a rechargeable lithium battery is provided that includes a non-aqueous organic solvent, a lithium salt, and an electrolyte additive. The electrolyte additive includes 2 to 6 wt % of succinonitrile, 2 to 6 wt % of alkane sultone, and 1 to 3 wt % of vinylethylene carbonate based on the total weight of the electrolyte.

Also, the electrolyte additive for the rechargeable lithium battery may include 35 to 300 parts by weight of the alkane sultone, 20 to 150 parts by weight of the vinylethylene carbonate based on 100 parts by weight of the succinonitrile.

The alkane sultone may be one selected from the group consisting of 1,3-propane sultone, butane sultone, 1,3-(1-propene sultone) (prop-1-ene-1,3-sultone), and combinations thereof.

Another embodiment of the present invention, a rechargeable lithium battery is provided that includes a positive electrode including a positive active material, a negative electrode including a negative active material, and the above electrolyte.

The positive active material may be selected from the compounds represented by the following formulae:

$Li_aA_{1-b}D_bE_2$ wherein, in the above formula, $0.90 \leq a \leq 1.8$, and $0 \leq b \leq 0.5$); $Li_aG_{1-b}D_bO_{2-c}E_c$ wherein, in the above formula, $0.90 \leq a \leq 1.8$, $0 \leq b \leq 0.5$, and $0 \leq c \leq 0.05$); $LiG_{2-b}D_bO_{4-c}E_c$ wherein, in the above formula, $0 \leq b \leq 0.5$, and $0 \leq c \leq 0.05$; $Li_aNi_{1-b-c}Co_bD_cE_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Co_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Co_bD_cO_{2-\alpha}J_2$ wherein, in the above formula, $0.9 \leq a \leq 1.8$, $0 \leq b \leq 0.5$, $0 \leq c \leq 0.05$, and $0 < \alpha < 2$; $Li_aNi_{1-b-c}Mn_bD_cE_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Mn_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bD_cO_{2-\alpha}J_2$ wherein, in the above formula, $0.90 \leq a \leq 1.8$, $0 \leq b \leq 0.5$, $0 \leq c \leq 0.05$, and $0 < \alpha < 2$; $Li_aNi_bG_cL_dO_2$ wherein, in the above formula, $0.90 \leq a \leq 1.8$, $0 \leq b \leq 0.9$, $0 \leq c \leq 0.05$, and $0.001 \leq d \leq 0.2$; $Li_aNi_bG_cO_2$ wherein, in the above formula, $0.90 \leq a \leq 1.8$, $0 \leq b \leq 0.9$, and $0 \leq c \leq 0.5$, and $Li_aNi_bCo_cMn_dL_eO_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.2$; $Li_aNi_bCo_cMn_dO_2$ wherein, in the above formula, $0.90 \leq a \leq 1.8$, $0 \leq b \leq 0.9$, $0 \leq c \leq 0.5$, and $0 \leq d \leq 0.5$;

$Li_aNiL_bO_2$ wherein, in the above formula, $0.90 \leq a \leq 1.8$, and $0.001 \leq b \leq 0.2$; $Li_aCoL_bO_2$ wherein, in the above formula, $0.90 \leq a \leq 1.8$, and $0.001 \leq b \leq 0.2$; $Li_aMnL_bO_2$ wherein, in the above formula, $0.90 \leq a \leq 1.8$, and $0.0001 \leq b \leq 0.2$; $Li_aMn_2L_bO_4$ wherein, the above formula, $0.90 \leq a \leq 1.8$, and $0.001 \leq b \leq 0.2$; $Li_aMn_2O_4$ wherein, in the above formula, $0.9 \leq a \leq 1.8$; $MO_2$; $MS_2$; $LiMS_2$; $V_2O_5$; $LiV_2O_5$; $LiQO_4$; $LiNiVO_4$; $Li_{(3-f)}T_2(PO_4)_3$ wherein, the above formula, $0 \leq f \leq 2$; $Li_{(3-f)}Fe_2(PO_4)_3$ wherein, in the above formula, $0 \leq f \leq 2$; and $LiFePO_4$.

In the above chemical formulae, A is selected from the group consisting of Ni, Co, Mn, and combinations thereof, D is selected from the group consisting of Al, Ni, Co, Mn, Cr, Fe, Mg, Sr, V, a rare earth element, and combinations thereof, E is selected from the group consisting of O, F, S, P, and combinations thereof, G is selected from the group consisting of Co, Mn, and combinations thereof, J is selected from the group consisting of F, S, P, and combinations thereof, L is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, and combinations thereof, M is selected from the group consisting of Ti, Mo, Mn, and combinations thereof, Q is selected from the group consisting of Cr, V, Fe, Sc, Ti, Y, and combinations thereof, and T is selected from the group consisting of V, Cr, Mn, Co, Ni, Cu, and combinations thereof. In one embodiment, for the positive active material, $LiCoO_2$ is preferable.

The negative active material may include $SiO_x$ ($0<x<2$) or $SiO_x$ ($0<x<2$) coated with carbon.

The rechargeable lithium battery may have a charge voltage of 4.3 V or higher. In one embodiment, the charge voltage may be between 4.3 V and 4.5 V.

Hereinafter, further embodiments of the present invention will be described in more detail.

The electrolyte for a rechargeable lithium battery including an electrolyte additive for a rechargeable lithium battery in accordance with an aspect of the present invention may have improved storage characteristics at high voltage and high temperature to thereby improve the storage characteristics of the rechargeable lithium battery at high voltage and high temperature.

BRIEF DESCRIPTION OF THE DRAWING

FIG. 1 is a schematic view of a rechargeable lithium battery according to an embodiment of the present invention.

DETAILED DESCRIPTION

Exemplary embodiments of the present invention will hereinafter be described in more detail. However, these embodiments are only exemplary, and the present invention is not limited thereto.

The electrolyte for a rechargeable lithium battery according to one embodiment of the present invention includes a non-aqueous organic solvent, a lithium salt, and an electrolyte additive. The electrolyte additive includes 2 to 6 wt % of succinonitrile, 2 to 6 wt % of alkane sultone, and 1 to 3 wt % of vinylethylene carbonate based on the total weight of the electrolyte. When succinonitrile, alkane sultone and vinylethylene carbonate are included within the above amount ranges, the rechargeable lithium battery does not have any decrease in the standard capacity and has high capacity retention when it is stored at high pressure and high temperature.

Also, the electrolyte additive of the rechargeable lithium battery may include 35 to 300 parts by weight of the alkane sultone and 20 to 150 parts by weight of the vinylethylene carbonate based on the 100 parts by weight of succinonitrile. When the succinonitrile, alkane sultone and vinylethylene carbonate are included within the above ranges, the rechargeable lithium battery including them does not have any decrease in standard capacity and has high capacity retention when it is stored at high pressure and high temperature.

The alkane sultone may be a material selected from the group consisting of 1,3-propane sultone, butane sultone, 1,3-(1-propene sultone) and combinations thereof but is not limited thereto.

In the electrolyte of a rechargeable lithium battery, the non-aqueous organic solvent acts as a medium for transmitting ions taking part in the electrochemical reaction of the battery. The non-aqueous organic solvent may include a carbonate-based, ester-based, ether-based, ketone-based, alcohol-based, and/or aprotic solvent.

Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Non-limiting examples of the ester-based solvent include methyl acetate, ethyl acetate, n-propyl acetate, dimethyl acetate, methyl propinonate, ethyl propinonate, γ-butyrolactone, decanolide, valerolactone, mevalonolactone, caprolactone, and the like. Non-limiting examples of the ether-based solvent include dimethyl ether, dibutyl ether, tetraglyme, diglyme, dimethoxyethane, 2-methyltetrahydrofuran, tetrahydrofuran (THF), and the like. Non-limiting examples of the ketone-based solvent include cyclohexanone, and the like. Non-limiting examples of the alcohol-based solvent include ethyl alcohol, isopropyl alcohol, and the like. Non-limiting examples of the aprotic solvent include nitriles such as R—CN (wherein R is a C2 to C20 linear, branched, or cyclic hydrocarbon, and may include one or more double bonds, one or more aromatic rings, or one or more ether bonds), amides such as dimethylformamide, dimethylacetamide, dioxolanes such as 1,3-dioxolane, sulfolanes, cycloalkanes such as cyclohexane, and the like.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio between 1:1 and 1:9, and when the mixture is used as an electrolyte, the electrolyte performance may be enhanced.

In addition, the electrolyte for a rechargeable lithium battery according to one embodiment of the present invention may further include mixtures of carbonate-based solvents and aromatic hydrocarbon-based solvents. The carbonate-based solvents and the aromatic hydrocarbon-based solvents are, in one embodiment of the present invention, mixed together in the volume ratio between 1:1 and 30:1.

The aromatic hydrocarbon-based organic solvent may be represented by the following Chemical Formula 1.

Chemical Formula 1

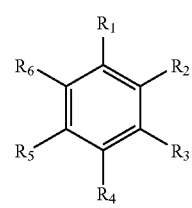

In the above Chemical Formula 1, $R_1$ to $R_6$ are the same or different, and independently hydrogen, a halogen, a C1 to C10 alkyl, a C1 to C10 haloalkyl, or combinations thereof.

The aromatic hydrocarbon-based organic solvent may include, but is not limited to, a material selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include vinylene carbonate and/or an ethylene carbonate-based compound of the following Chemical Formula 2 in order to improve battery cycle-life.

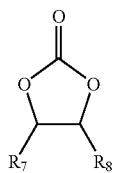

Chemical Formula 2

In the above Chemical Formula 2, $R_7$ and $R_8$ are the same or different, and can independently be hydrogen; a halogen; a cyano (CN); a nitro ($NO_2$); and/or a C1 to C5 fluoroalkyl, provided that both $R_7$ and $R_8$ are not hydrogen.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and combinations thereof. The use amount of the additive for improving cycle life may be adjusted within a suitable range.

The lithium salt supplies lithium ions in the battery, and operates a basic operation of a rechargeable lithium battery and improves lithium ion transport between positive and negative electrodes. Non-limiting examples of the lithium salt include a supporting salt selected from $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_4$, $LiAlO_2$, $LiAlCl_4$, $LiN(C_xF_{2x+1}SO_2)(C_yF_{2y+1}SO_2)$ where, x and y are natural numbers, LiCl, LiI, $LiB(C_2O_4)_2$(lithium bis(oxalato)borate, LiBOB), and combinations thereof. The lithium salt may be used at a 0.1 to 2.0M concentration, and in one embodiment, at a 0.5 to 2.0M concentration. When the lithium salt is included at the above concentration range, electrolyte performance and lithium ion mobility may be enhanced due to improved electrolyte conductivity and viscosity.

According to another embodiment of the present invention, a rechargeable lithium battery is provided that includes a positive electrode including a positive active material, a negative electrode including a negative active material, and the above described electrolyte.

The positive electrode includes a current collector and a positive active material layer including a positive active material positioned on the current collector.

The positive active material includes lithiated intercalation compounds that reversibly intercalate and deintercalate lithium ions. The positive active material may include a composite oxide including a material selected from the group consisting of cobalt, manganese, nickel, and combinations thereof, as well as lithium. In one embodiment, the following lithium-containing compounds may be used, but are not limited thereto:

$Li_aA_{1-b}D_bE_2$ wherein, in the above formula, $0.90 \leq a \leq 1.8$, and $0 \leq b \leq 0.5$); $Li_aG_{1-b}D_bO_{2-c}E_c$ wherein, in the above formula, $0.90 \leq a \leq 1.8$, $0 \leq b \leq 0.5$, and $0 \leq c \leq 0.05$); $LiG_{2-b}D_bO_{4-c}E_c$ wherein, in the above formula, $0 \leq b \leq 0.5$, and $0 \leq c \leq 0.5$; $Li_aNi_{1-b-c}Co_bD_cE_\alpha$ wherein, in the above formula, $0.9 \leq a \leq 1.8$, $0 \leq b \leq 0.5$, $0 \leq c \leq 0.05$, and $0 < \alpha \leq 2$; $Li_aNi_{1-b-c}Co_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Co_bD_cO_{2-\alpha}J_2$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bD_cE_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Mn_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bD_cO_{2-\alpha}J_2$ wherein, in the above formula, $0.90 \leq a \leq 1.8$, $0 \leq b \leq 0.5$, $0 \leq c \leq 0.05$, and $0 < \alpha < 2$; $Li_aNi_bG_cL_dO_2$ wherein, in the above formula, $0.90 \leq a \leq 1.8$, $0 \leq b \leq 0.9$, $0 \leq c \leq 0.5$, and $0.001 \leq d \leq 0.2$; $Li_aNi_bG_cO_2$ wherein, in the above formula, $0.90 \leq a \leq 1.8$, $0 \leq b \leq 0.9$, and $0 \leq c \leq 0.5$; $Li_aNi_bCo_cMn_dL_eO_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.2$; $Li_aNi_bCo_cMn_dO_2$ wherein, in the above formula, $0.90 \leq a \leq 1.8$, $0 \leq b \leq 0.9$, $0 \leq c \leq 0.5$, and $0 \leq d \leq 0.5$; $Li_aNiL_bO_2$ wherein, in the above formula, $0.90 \leq a \leq 1.8$, and $0.001 \leq b \leq 0.2$; $Li_aCoL_bO_2$ wherein, in the above formula, $0.90 \leq a \leq 1.8$, and $0.001 \leq b \leq 0.2$; $Li_aMnL_bO_2$ wherein, in the above formula, $0.90 \leq a \leq 1.8$, and $0.001 \leq b \leq 0.2$; $Li_aMn_2L_bO_4$ wherein, in the above formula, $0.90 \leq a \leq 1.8$, and $0.001 \leq b \leq 0.2$; $Li_aMn_2O_4$ wherein, in the above formula, $0.90 \leq a \leq 1.8$; $MO_2$; $MS_2$; $LiMS_2$; $V_2O_5$; $LiV_2O_5$; $LiQO_2$; $LiNiVO_4$; $Li_{(3-f)}T_2(PO_4)_3$ wherein, in the above formula, $0 \leq f \leq 2$; $Li_{(3-f)}Fe_2(PO_4)_3$ wherein, in the above formula, $0 \leq f \leq 2$; and $LiFePO_4$.

In the above chemical formulae, A is selected from the group consisting of Ni, Co, Mn, and combinations thereof, D is selected from the group consisting of Al, Ni, Co, Mn, Cr, Fe, Mg, Sr, V, a rare earth element, and combinations thereof, E is selected from the group consisting of O, F, S, P, and combinations thereof, G is selected from the group consisting of Co, Mn, and combinations thereof, J is selected from the group consisting of F, S, P, and combinations thereof, L is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, and combinations thereof, M is selected from the group consisting of Ti, Mo, Mn, and combinations thereof, Q is selected from the group consisting of Cr, V, Fe, Sc, Ti, Y, and combinations thereof, and T is selected from the group consisting of V, Cr, Mn, Co, Ni, Cu, and combinations thereof.

In one embodiment, for the positive active material, $LiCoO_2$ is preferable. When the positive active material includes $LiCoO_2$, the rechargeable lithium battery including an electrolyte additive may have more improved storage characteristics at high voltage and high temperature.

The positive active material may include the positive active material with the coating layer, or a compound of the active material and the active material coated with the coating layer. The coating layer may include a coating element compound selected from the group consisting of an oxide of the coating element and a hydroxide of the coating element, an oxyhydroxide of the coating element, an oxycarbonate of the coating element, a hydroxycarbonate of the coating element, and combinations thereof. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating process may include any suitable processes as long as it does not cause any side effects on the properties of the positive active material (e.g., spray coating, immersing), which is known to persons having ordinary skill in this art, so a detailed description thereof is not provided.

The positive active material layer further includes a binder and a conductive material.

The binder improves binding properties of the positive active material particles to each other and to a current collector. Examples of the binder include a material selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, styrene-butadiene rubber, acrylated styrene-butadiene rubber, an epoxy resin, nylon, and the like, and combinations thereof, but is not limited thereto.

The conductive material improves electrical conductivity of a negative electrode. Any electrically conductive material can be used as a conductive agent unless it causes a chemical change. Examples of the conductive material include a material selected from natural graphite, artificial graphite, carbon black, Super-P (MMM company), acetylene black, ketjen black, hard carbon obtained through sintering at a high temperature), soft carbon (carbon obtained through sintering at a low temperature), carbon fiber, a metal powder or a metal fiber including copper, nickel, aluminum, silver, and the like, polyphenylene derivative, and the like, and combinations thereof.

The current collector may be Al, but is not limited thereto.

The negative electrode includes a current collector and a negative active material layer disposed thereon. The negative active material layer includes a negative active material.

The negative active material includes a material that reversibly intercalates/deintercalates lithium ions, a lithium metal, a lithium metal alloy, a material capable of doping (and/or undoping) lithium, and/or a transition metal oxide.

The material that can reversibly intercalate/deintercalate lithium ions includes a carbon material. The carbon material may be any suitable carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbide, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, Sn, Ti, Ag, Cd, Ga, Bi, and combinations thereof.

Examples of the material capable of doping lithium include Si, $SiO_x$ ($0<x<2$), a Si—Y alloy (where Y is an element selected from the group consisting of an alkali metal, an alkaline-earth metal, a group 13 element, a group 14 element, a transition element, a rare earth element, and combinations thereof, and is not Si), Sn, $SnO_2$, a Sn—Y alloy (where Y is an element selected from the group consisting of an alkali metal, an alkaline-earth metal, a group 13 element, a group 14 element, a transition element, a rare earth element, and combinations thereof and is not Sn), or mixtures thereof. At least one of these materials may be mixed with $SiO_2$. In addition, carbon may be further deposited on the surface of the material capable of doping lithium. Coating the surface of the above materials with carbon may be performed by decomposing such organic materials as ethylene, tetrahydrofuran (THF), and cyclohexanone at high temperature of 800° C. or higher in vacuum in the presence of the above materials, but is not limited thereto. The element Y can be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Examples of the transition metal oxide include vanadium oxide, lithium vanadium oxide, and the like.

The negative active material layer includes a binder, and optionally a conductive material.

The binder improves binding properties of negative active material particles with one another and with a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, Super-P (MMM company), acetylene black, ketjen black, hard carbon, soft carbon, carbon fiber, and the like; metal-based materials of metal powder or metal fiber including copper, nickel, aluminum, silver, and the like; conductive polymers such as polyphenylene derivatives; or mixtures thereof.

The current collector may be selected from the group consisting of a copper foil, a nickel foil, a stainless steel foil, a titanium foil, a nickel foam, a copper foam, a polymer substrate coated with a conductive metal, and combinations thereof.

The positive and negative electrodes may be fabricated by a method including mixing the active material, a conductive material, and a binder into an active material composition and coating the composition on a current collector. The electrode manufacturing method is known, and thus is not described in more detail in the present specification. The solvent can be N-methylpyrrolidone but it is not limited thereto.

The charge voltage of the rechargeable lithium battery may be equal to or higher than 4.3V. In one embodiment, it may be between 4.3V and 4.5V, but is not limited thereto. The rechargeable lithium battery including the electrolyte additive for a rechargeable lithium battery according to an embodiment of the present invention may efficiently operate at a high charge voltage of the above-mentioned range.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and fabricating methods for lithium ion batteries pertaining to the present invention are known in the art.

FIG. 1 is a schematic view of a representative structure of a rechargeable lithium battery. Referring to FIG. 1, the rechargeable lithium battery 3 is a prismatic battery which includes an electrode assembly 4 in a battery case 8, an electrolyte implanted (or injected or filled) to the upper portion of the case 8, and a cap plate 11 sealing the case 8. The electrode assembly 4 includes a positive electrode 5, a negative electrode 6 and a separator 7 positioned between the positive electrode 5 and negative electrode 6. The rechargeable lithium battery of the present invention is not limited to a prismatic type of a rechargeable lithium battery, and it may be formed in diverse forms such as a cylindrical form, a coin-type form, a pouch form as long as it includes the electrolyte for a rechargeable lithium battery and operates as a battery.

The following examples illustrate the present invention in more detail. These examples, however, are not intended to limit the scope of the present invention.

Examples

Preparation of Electrolyte

Preparation Example 1

An electrolyte was prepared by mixing ethylene carbonate, ethylmethyl carbonate and diethyl carbonate in a weight ratio of 3:2:5 (ethylene carbonate:ethylmethyl carbonate:diethyl carbonate), adding 1.3M $LiPF_6$, and also adding 2 wt % of succinonitrile (SN), 2 wt % of 1,3-propane sultone (1,3-PS), 1 wt % of vinylethylene carbonate (VEC) based on the total weight of the electrolyte as additives.

Preparation Examples 2-27

An electrolyte was prepared according to the same method as Preparation Example 1, except that succinonitrile (SN), 1,3-propane sultone (1,3-PS), and vinylethylene carbonate (VEC) were added in the ratios shown in the following Table 1 based on the total weight of the electrolyte.

TABLE 1

|  | SN (wt %) | 1,3-PS (wt %) | VEC (wt %) |
|---|---|---|---|
| Preparation Example 1 | 2 | 2 | 1 |
| Preparation Example 2 | 2 | 2 | 2 |
| Preparation Example 3 | 2 | 2 | 3 |
| Preparation Example 4 | 2 | 4 | 1 |
| Preparation Example 5 | 2 | 4 | 2 |
| Preparation Example 6 | 2 | 4 | 3 |
| Preparation Example 7 | 2 | 6 | 1 |

TABLE 1-continued

|  | SN (wt %) | 1,3-PS (wt %) | VEC (wt %) |
|---|---|---|---|
| Preparation Example 8 | 2 | 6 | 2 |
| Preparation Example 9 | 2 | 6 | 3 |
| Preparation Example 10 | 4 | 2 | 1 |
| Preparation Example 11 | 4 | 2 | 2 |
| Preparation Example 12 | 4 | 2 | 3 |
| Preparation Example 13 | 4 | 4 | 1 |
| Preparation Example 14 | 4 | 4 | 2 |
| Preparation Example 15 | 4 | 4 | 3 |
| Preparation Example 16 | 4 | 6 | 1 |
| Preparation Example 17 | 4 | 6 | 2 |
| Preparation Example 18 | 4 | 6 | 3 |
| Preparation Example 19 | 6 | 2 | 1 |
| Preparation Example 20 | 6 | 2 | 2 |
| Preparation Example 21 | 6 | 2 | 3 |
| Preparation Example 22 | 6 | 4 | 1 |
| Preparation Example 23 | 6 | 4 | 2 |
| Preparation Example 24 | 6 | 4 | 3 |
| Preparation Example 25 | 6 | 6 | 1 |
| Preparation Example 26 | 6 | 6 | 2 |
| Preparation Example 27 | 6 | 6 | 3 |

Comparative Preparation Example 1

An electrolyte was prepared by mixing ethylene carbonate, ethylmethyl carbonate and diethylcarbonate in a weight ratio of 3:2:5 (ethylene carbonate:ethylmethyl carbonate:diethyl carbonate), and adding 1.3M $LiPF_6$.

Comparative Preparation Examples 2 to 98

An electrolyte was prepared according to the same method as Comparative Preparation Example 1, except that succinonitrile (SN), 1,3-propanesultone (1,3-PS), and vinylethylene carbonate (VEC) were selectively added in the ratios shown in the following Table 2 based on the total weight of the electrolyte.

TABLE 2

|  | SN (wt %) | 1,3-PS (wt %) | VEC (wt %) |
|---|---|---|---|
| Comparative Preparation Example 1 | 0 | 0 | 0 |
| Comparative Preparation Example 2 | 0 | 0 | 1 |
| Comparative Preparation Example 3 | 0 | 0 | 2 |
| Comparative Preparation Example 4 | 0 | 0 | 3 |
| Comparative Preparation Example 5 | 0 | 0 | 4 |
| Comparative Preparation Example 6 | 0 | 2 | 0 |
| Comparative Preparation Example 7 | 0 | 2 | 1 |
| Comparative Preparation Example 8 | 0 | 2 | 2 |
| Comparative Preparation Example 9 | 0 | 2 | 3 |
| Comparative Preparation Example 10 | 0 | 2 | 4 |
| Comparative Preparation Example 11 | 0 | 4 | 0 |
| Comparative Preparation Example 12 | 0 | 4 | 1 |
| Comparative Preparation Example 13 | 0 | 4 | 2 |
| Comparative Preparation Example 14 | 0 | 4 | 3 |
| Comparative Preparation Example 15 | 0 | 4 | 4 |
| Comparative Preparation Example 16 | 0 | 6 | 0 |
| Comparative Preparation Example 17 | 0 | 6 | 1 |
| Comparative Preparation Example 18 | 0 | 6 | 2 |
| Comparative Preparation Example 19 | 0 | 6 | 3 |
| Comparative Preparation Example 20 | 0 | 6 | 4 |
| Comparative Preparation Example 21 | 0 | 8 | 0 |
| Comparative Preparation Example 22 | 0 | 8 | 1 |
| Comparative Preparation Example 23 | 0 | 8 | 2 |
| Comparative Preparation Example 24 | 0 | 8 | 3 |
| Comparative Preparation Example 25 | 0 | 8 | 4 |
| Comparative Preparation Example 26 | 2 | 0 | 0 |
| Comparative Preparation Example 27 | 2 | 0 | 1 |
| Comparative Preparation Example 28 | 2 | 0 | 2 |
| Comparative Preparation Example 29 | 2 | 0 | 3 |

TABLE 2-continued

| | SN (wt %) | 1,3-PS (wt %) | VEC (wt %) |
|---|---|---|---|
| Comparative Preparation Example 30 | 2 | 0 | 4 |
| Comparative Preparation Example 31 | 2 | 2 | 0 |
| Comparative Preparation Example 32 | 2 | 2 | 4 |
| Comparative Preparation Example 33 | 2 | 4 | 0 |
| Comparative Preparation Example 34 | 2 | 4 | 4 |
| Comparative Preparation Example 35 | 2 | 6 | 0 |
| Comparative Preparation Example 36 | 2 | 6 | 4 |
| Comparative Preparation Example 37 | 2 | 8 | 0 |
| Comparative Preparation Example 38 | 2 | 8 | 1 |
| Comparative Preparation Example 39 | 2 | 8 | 2 |
| Comparative Preparation Example 40 | 2 | 8 | 3 |
| Comparative Preparation Example 41 | 2 | 8 | 4 |
| Comparative Preparation Example 42 | 4 | 0 | 0 |
| Comparative Preparation Example 43 | 4 | 0 | 1 |
| Comparative Preparation Example 44 | 4 | 0 | 2 |
| Comparative Preparation Example 45 | 4 | 0 | 3 |
| Comparative Preparation Example 46 | 4 | 0 | 4 |
| Comparative Preparation Example 47 | 4 | 2 | 0 |
| Comparative Preparation Example 48 | 4 | 2 | 4 |
| Comparative Preparation Example 49 | 4 | 4 | 0 |
| Comparative Preparation Example 50 | 4 | 4 | 4 |
| Comparative Preparation Example 51 | 4 | 6 | 0 |
| Comparative Preparation Example 52 | 4 | 6 | 4 |
| Comparative Preparation Example 53 | 4 | 8 | 0 |
| Comparative Preparation Example 54 | 4 | 8 | 1 |
| Comparative Preparation Example 55 | 4 | 8 | 2 |
| Comparative Preparation Example 56 | 4 | 8 | 3 |
| Comparative Preparation Example 57 | 4 | 8 | 4 |
| Comparative Preparation Example 58 | 6 | 0 | 0 |
| Comparative Preparation Example 59 | 6 | 0 | 1 |
| Comparative Preparation Example 60 | 6 | 0 | 2 |
| Comparative Preparation Example 61 | 6 | 0 | 3 |
| Comparative Preparation Example 62 | 6 | 0 | 4 |
| Comparative Preparation Example 63 | 6 | 2 | 0 |
| Comparative Preparation Example 64 | 6 | 2 | 4 |
| Comparative Preparation Example 65 | 6 | 4 | 0 |
| Comparative Preparation Example 66 | 6 | 4 | 4 |
| Comparative Preparation Example 67 | 6 | 6 | 0 |
| Comparative Preparation Example 68 | 6 | 6 | 4 |
| Comparative Preparation Example 69 | 6 | 8 | 0 |
| Comparative Preparation Example 70 | 6 | 8 | 1 |
| Comparative Preparation Example 71 | 6 | 8 | 2 |
| Comparative Preparation Example 72 | 6 | 8 | 3 |
| Comparative Preparation Example 73 | 6 | 8 | 4 |
| Comparative Preparation Example 74 | 8 | 0 | 0 |
| Comparative Preparation Example 75 | 8 | 0 | 1 |
| Comparative Preparation Example 76 | 8 | 0 | 2 |
| Comparative Preparation Example 77 | 8 | 0 | 3 |
| Comparative Preparation Example 78 | 8 | 0 | 4 |
| Comparative Preparation Example 79 | 8 | 2 | 0 |
| Comparative Preparation Example 80 | 8 | 2 | 1 |
| Comparative Preparation Example 81 | 8 | 2 | 2 |
| Comparative Preparation Example 82 | 8 | 2 | 3 |
| Comparative Preparation Example 83 | 8 | 2 | 4 |
| Comparative Preparation Example 84 | 8 | 4 | 0 |
| Comparative Preparation Example 85 | 8 | 4 | 1 |
| Comparative Preparation Example 86 | 8 | 4 | 2 |
| Comparative Preparation Example 87 | 8 | 4 | 3 |
| Comparative Preparation Example 88 | 8 | 4 | 4 |
| Comparative Preparation Example 89 | 8 | 6 | 0 |
| Comparative Preparation Example 90 | 8 | 6 | 1 |
| Comparative Preparation Example 91 | 8 | 6 | 2 |
| Comparative Preparation Example 92 | 8 | 6 | 3 |
| Comparative Preparation Example 93 | 8 | 6 | 4 |
| Comparative Preparation Example 94 | 8 | 8 | 0 |
| Comparative Preparation Example 95 | 8 | 8 | 1 |
| Comparative Preparation Example 96 | 8 | 8 | 2 |
| Comparative Preparation Example 97 | 8 | 8 | 3 |
| Comparative Preparation Example 98 | 8 | 8 | 4 |

Preparation of Rechargeable Lithium Battery Cells

Examples 1 to 27

A positive active material slurry was prepared by mixing a LiCoO$_2$ positive active material, a polyvinylidenefluoride binder, and Super-P (MMM company) conductive material in a weight ratio of 94:3:3 (LiCoO$_2$:polyvinylidenefluoride:Super-P) in a N-methyl pyrrolidone solvent. The upper surface of a 12 μm-thick aluminum current collector was uniformly dried and compressed to thereby fabricate a positive electrode.

A negative active material was prepared by decomposing ethylene gas at a temperature of 900° C. in vacuum in the presence of silicon oxide (SiO$_x$, x=1) to thereby deposit carbon on the surface of the silicon oxide surface and coat the silicon oxide surface with the carbon. A negative active material slurry was prepared by mixing the silicon oxide (SiO$_x$, x=1) negative active material coated with carbon with polyamideimide (PAI) binder in a weight ratio of 90:10 (silicon oxide coated with carbon:polyamideimide) in N-methylpyrrolidone solvent. A 12 μm-thick copper current collector was uniformly coated with the negative active material slurry, dried, and compressed to thereby fabricate a negative electrode.

553450 prismatic battery cells were fabricated in a suitable method by using the positive electrode and the negative electrode fabricated in the above and the electrolytes prepared according to Preparation Examples 1 to 27, respectively. The fabricated prismatic battery cells were sequentially referred to as Examples 1 to 27.

Comparative Examples 1 to 98

553450 prismatic battery cells were fabricated in a conventional method by using the positive electrodes and the negative electrodes fabricated in the Examples 1 to 27 and the electrolytes prepared according to Comparative Preparation Examples 1 to 98, respectively. The fabricated prismatic battery cells were sequentially referred to as Comparative Examples 1 to 98.

Assessment of Storage Characteristic at High Temperature

Battery cells fabricated according to Examples 1 to 27 and Comparative Examples 1 to 98 were charged at 0.2 C and discharged at 0.2 C one time, which is called a formation process, and charged at 0.5 C and discharged at 0.2 C one time, which is called a standard process. The standard capacities were the discharge capacities of the standard process and the measured standard capacities were as shown in the following Table 3.

The battery cells fabricated according to Examples 1 to 27 and Comparative Examples 1 to 98 were charged at 0.5 C at a charge potential of 4.35V and a discharge potential of 2.5V, stored in an oven at 60° C. for 4 weeks, discharged at 0.2 C, and then their capacity retention relative to standard capacity was measured. The results were shown in the following Table 3.

TABLE 3

| | SN (wt %) | 1,3-PS (wt %) | VEC (wt %) | Standard capacity (mAh) | Capacity retention after storage at 60° C. for 4 weeks relative to standard capacity (%) |
|---|---|---|---|---|---|
| Example 1 | 2 | 2 | 1 | 1400 | 85 |
| Example 2 | 2 | 2 | 2 | 1400 | 87 |
| Example 3 | 2 | 2 | 3 | 1400 | 83 |
| Example 4 | 2 | 4 | 1 | 1400 | 84 |
| Example 5 | 2 | 4 | 2 | 1400 | 88 |
| Example 6 | 2 | 4 | 3 | 1400 | 86 |
| Example 7 | 2 | 6 | 1 | 1400 | 84 |

TABLE 3-continued

| | SN (wt %) | 1,3-PS (wt %) | VEC (wt %) | Standard capacity (mAh) | Capacity retention after storage at 60° C. for 4 weeks relative to standard capacity (%) |
|---|---|---|---|---|---|
| Example 8 | 2 | 6 | 2 | 1400 | 85 |
| Example 9 | 2 | 6 | 3 | 1400 | 83 |
| Example 10 | 4 | 2 | 1 | 1400 | 82 |
| Example 11 | 4 | 2 | 2 | 1400 | 88 |
| Example 12 | 4 | 2 | 3 | 1400 | 86 |
| Example 13 | 4 | 4 | 1 | 1400 | 88 |
| Example 14 | 4 | 4 | 2 | 1400 | 89 |
| Example 15 | 4 | 4 | 3 | 1400 | 85 |
| Example 16 | 4 | 6 | 1 | 1400 | 81 |
| Example 17 | 4 | 6 | 2 | 1400 | 83 |
| Example 18 | 4 | 6 | 3 | 1400 | 83 |
| Example 19 | 6 | 2 | 1 | 1400 | 83 |
| Example 20 | 6 | 2 | 2 | 1400 | 84 |
| Example 21 | 6 | 2 | 3 | 1400 | 85 |
| Example 22 | 6 | 4 | 1 | 1400 | 85 |
| Example 23 | 6 | 4 | 2 | 1400 | 84 |
| Example 24 | 6 | 4 | 3 | 1400 | 82 |
| Example 25 | 6 | 6 | 1 | 1400 | 84 |
| Example 26 | 6 | 6 | 2 | 1400 | 87 |
| Example 27 | 6 | 6 | 3 | 1400 | 81 |
| Comparative Example 1 | 0 | 0 | 0 | 1400 | 50 |
| Comparative Example 2 | 0 | 0 | 1 | 1400 | 51 |
| Comparative Example 3 | 0 | 0 | 2 | 1400 | 50 |
| Comparative Example 4 | 0 | 0 | 3 | 1400 | 53 |
| Comparative Example 5 | 0 | 0 | 4 | 1400 | 51 |
| Comparative Example 6 | 0 | 2 | 0 | 1400 | 53 |
| Comparative Example 7 | 0 | 2 | 1 | 1400 | 54 |
| Comparative Example 8 | 0 | 2 | 2 | 1400 | 51 |
| Comparative Example 9 | 0 | 2 | 3 | 1400 | 53 |
| Comparative Example 10 | 0 | 2 | 4 | 1400 | 51 |
| Comparative Example 11 | 0 | 4 | 0 | 1400 | 55 |
| Comparative Example 12 | 0 | 4 | 1 | 1400 | 54 |
| Comparative Example 13 | 0 | 4 | 2 | 1400 | 56 |
| Comparative Example 14 | 0 | 4 | 3 | 1400 | 58 |
| Comparative Example 15 | 0 | 4 | 4 | 1400 | 60 |
| Comparative Example 16 | 0 | 6 | 0 | 1400 | 63 |
| Comparative Example 17 | 0 | 6 | 1 | 1400 | 64 |
| Comparative Example 18 | 0 | 6 | 2 | 1400 | 62 |
| Comparative Example 19 | 0 | 6 | 3 | 1400 | 65 |
| Comparative Example 20 | 0 | 6 | 4 | 1400 | 61 |
| Comparative Example 21 | 0 | 8 | 0 | 1395 | 62 |
| Comparative Example 22 | 0 | 8 | 1 | 1395 | 60 |
| Comparative Example 23 | 0 | 8 | 2 | 1395 | 61 |
| Comparative Example 24 | 0 | 8 | 3 | 1395 | 59 |
| Comparative Example 25 | 0 | 8 | 4 | 1395 | 58 |
| Comparative Example 26 | 2 | 0 | 0 | 1400 | 55 |
| Comparative Example 27 | 2 | 0 | 1 | 1400 | 56 |
| Comparative Example 28 | 2 | 0 | 2 | 1400 | 52 |
| Comparative Example 29 | 2 | 0 | 3 | 1400 | 57 |
| Comparative Example 30 | 2 | 0 | 4 | 1400 | 56 |
| Comparative Example 31 | 2 | 2 | 0 | 1400 | 59 |
| Comparative Example 32 | 2 | 2 | 4 | 1400 | 58 |
| Comparative Example 33 | 2 | 4 | 0 | 1400 | 62 |
| Comparative Example 34 | 2 | 4 | 4 | 1400 | 60 |
| Comparative Example 35 | 2 | 6 | 0 | 1400 | 63 |
| Comparative Example 36 | 2 | 6 | 4 | 1400 | 60 |
| Comparative Example 37 | 2 | 8 | 0 | 1395 | 58 |
| Comparative Example 38 | 2 | 8 | 1 | 1395 | 59 |
| Comparative Example 39 | 2 | 8 | 2 | 1395 | 61 |
| Comparative Example 40 | 2 | 8 | 3 | 1395 | 60 |
| Comparative Example 41 | 2 | 8 | 4 | 1395 | 58 |
| Comparative Example 42 | 4 | 0 | 0 | 1400 | 57 |
| Comparative Example 43 | 4 | 0 | 1 | 1400 | 61 |
| Comparative Example 44 | 4 | 0 | 2 | 1400 | 62 |
| Comparative Example 45 | 4 | 0 | 3 | 1400 | 59 |
| Comparative Example 46 | 4 | 0 | 4 | 1400 | 57 |
| Comparative Example 47 | 4 | 2 | 0 | 1400 | 60 |
| Comparative Example 48 | 4 | 2 | 4 | 1400 | 64 |
| Comparative Example 49 | 4 | 4 | 0 | 1400 | 62 |
| Comparative Example 50 | 4 | 4 | 4 | 1400 | 64 |
| Comparative Example 51 | 4 | 6 | 0 | 1400 | 63 |
| Comparative Example 52 | 4 | 6 | 4 | 1400 | 65 |
| Comparative Example 53 | 4 | 8 | 0 | 1395 | 63 |
| Comparative Example 54 | 4 | 8 | 1 | 1395 | 62 |
| Comparative Example 55 | 4 | 8 | 2 | 1395 | 61 |
| Comparative Example 56 | 4 | 8 | 3 | 1395 | 65 |
| Comparative Example 57 | 4 | 8 | 4 | 1395 | 64 |
| Comparative Example 58 | 6 | 0 | 0 | 1400 | 58 |
| Comparative Example 59 | 6 | 0 | 1 | 1400 | 56 |
| Comparative Example 60 | 6 | 0 | 2 | 1400 | 54 |
| Comparative Example 61 | 6 | 0 | 3 | 1400 | 52 |
| Comparative Example 62 | 6 | 0 | 4 | 1400 | 51 |

TABLE 3-continued

| | SN (wt %) | 1,3-PS (wt %) | VEC (wt %) | Standard capacity (mAh) | Capacity retention after storage at 60° C. for 4 weeks relative to standard capacity (%) |
|---|---|---|---|---|---|
| Comparative Example 63 | 6 | 2 | 0 | 1400 | 58 |
| Comparative Example 64 | 6 | 2 | 4 | 1400 | 51 |
| Comparative Example 65 | 6 | 4 | 0 | 1400 | 54 |
| Comparative Example 66 | 6 | 4 | 4 | 1400 | 54 |
| Comparative Example 67 | 6 | 6 | 0 | 1400 | 55 |
| Comparative Example 68 | 6 | 6 | 4 | 1400 | 52 |
| Comparative Example 69 | 6 | 8 | 0 | 1395 | 54 |
| Comparative Example 70 | 6 | 8 | 1 | 1395 | 57 |
| Comparative Example 71 | 6 | 8 | 2 | 1395 | 58 |
| Comparative Example 72 | 6 | 8 | 3 | 1395 | 54 |
| Comparative Example 73 | 6 | 8 | 4 | 1395 | 59 |
| Comparative Example 74 | 8 | 0 | 0 | 1395 | 59 |
| Comparative Example 75 | 8 | 0 | 1 | 1395 | 59 |
| Comparative Example 76 | 8 | 0 | 2 | 1395 | 58 |
| Comparative Example 77 | 8 | 0 | 3 | 1395 | 52 |
| Comparative Example 78 | 8 | 0 | 4 | 1395 | 51 |
| Comparative Example 79 | 8 | 2 | 0 | 1395 | 53 |
| Comparative Example 80 | 8 | 2 | 1 | 1395 | 55 |
| Comparative Example 81 | 8 | 2 | 2 | 1395 | 54 |
| Comparative Example 82 | 8 | 2 | 3 | 1395 | 54 |
| Comparative Example 83 | 8 | 2 | 4 | 1395 | 58 |
| Comparative Example 84 | 8 | 4 | 0 | 1395 | 57 |
| Comparative Example 85 | 8 | 4 | 1 | 1395 | 54 |
| Comparative Example 86 | 8 | 4 | 2 | 1395 | 52 |
| Comparative Example 87 | 8 | 4 | 3 | 1395 | 54 |
| Comparative Example 88 | 8 | 4 | 4 | 1395 | 55 |
| Comparative Example 89 | 8 | 6 | 0 | 1395 | 52 |
| Comparative Example 90 | 8 | 6 | 1 | 1395 | 54 |
| Comparative Example 91 | 8 | 6 | 2 | 1395 | 56 |
| Comparative Example 92 | 8 | 6 | 3 | 1395 | 58 |
| Comparative Example 93 | 8 | 6 | 4 | 1395 | 52 |
| Comparative Example 94 | 8 | 8 | 0 | 1395 | 51 |
| Comparative Example 95 | 8 | 8 | 1 | 1395 | 53 |
| Comparative Example 96 | 8 | 8 | 2 | 1395 | 59 |
| Comparative Example 97 | 8 | 8 | 3 | 1395 | 57 |
| Comparative Example 98 | 8 | 8 | 4 | 1390 | 54 |

Table 3 shows that the battery cells of Comparative Examples 74 to 97, which included 8 wt % of succinonitrile, showed a decrease of standard capacity by 5 mAh. Also, the battery cell of Comparative Example 98, which included 8 wt % of succinonitrile, 8 wt % of 1,3-propane sultone, and 4 wt % of vinylethylene carbonate, showed a decrease of standard capacity by 10 mAh. In contrast, the battery cells of Examples 1 to 27 all did not have their standard capacity decreased.

Also, the battery cells of Comparative Examples 1 to 98 had their capacity retention relative to standard capacity deteriorated from 50% to 65% after stored at 60° C. for 4 weeks. On the other hand, the battery cells of Examples 1 to 27 had their capacity retention relative to standard capacity improved from 81% to 89% after stored at 60° C. for 4 weeks.

In consequences, it is confirmed that when a rechargeable lithium battery including 2 to 6 wt % of succinonitrile, 2 to 6 wt % of alkane sultone, and 1 to 3 wt % of vinylethylene carbonate as electrolyte additives for a rechargeable lithium battery based on the total weight of the electrolyte in accordance with an embodiment of the present invention, the rechargeable lithium battery does not have its standard capacity decreased and has high capacity retention when stored at high temperature, which are all desired rechargeable lithium battery performances.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrolyte for a rechargeable lithium battery, comprising:
   a non-aqueous organic solvent;
   a lithium salt; and
   an electrolyte additive,
   wherein the electrolyte additive comprises 2 to 6 wt % of succinonitrile, 2 to 6 wt % of a sultone, and 1 to 3 wt % of vinylethylene carbonate based on the total weight of the electrolyte, and wherein the sultone is selected from the group consisting of 1,3-propanesultone, butane sultone, 1,3-(1-propene sultone), and combinations thereof.

2. The electrolyte of claim 1, wherein the electrolyte additive of the rechargeable lithium battery includes 35 to 300 parts by weight of the sultone and 20 to 150 parts by weight of the vinylethylene carbonate based on 100 parts by weight of the succinonitrile.

3. A rechargeable lithium battery comprising:
   a positive electrode comprising a positive active material;
   a negative electrode comprising a negative active material; and an electrolyte comprising:
  a non-aqueous organic solvent;
  a lithium salt; and
  an electrolyte additive,
  wherein the electrolyte additive comprises 2 to 6 wt % of succinonitrile, 2 to 6 wt % of a sultone, and 1 to 3 wt % of vinylethylene carbonate based on the total weight of the electrolyte, and wherein the sultone is selected from the group consisting of 1,3-propanesultone, butane sultone, 1,3-(1-propene sultone), and combinations thereof.

4. The rechargeable lithium battery of claim 3, wherein the positive active material is selected from the group consisting of compounds represented by the following chemical formulae:

$Li_aA_{1-b}D_bE_2$ wherein, in $Li_aA_{1-b}D_bE_2$, $0.90 \leq a \leq 1.8$, and $0 \leq b \leq 0.5$; $Li_aG_{1-b}D_bO_{2-c}E_c$ wherein, in $Li_aG_{1-b}D_bO_{2-c}E_c$, $0.90 \leq a \leq 1.8$, $0 \leq b \leq 0.5$, and $0 \leq c \leq 0.05$; $LiG_{2-b}D_bO_{4-c}E_c$ wherein, in $LiG_{2-b}D_bO_{4-c}E_c$, $0 \leq b \leq 0.5$, and $0 \leq c \leq 0.05$; $Li_aNi_{1-b-c}Co_bD_cE_\alpha$ wherein, in $Li_aNi_{1-b-c}Co_bD_cE_\alpha$, $0.90 \leq a \leq 1.8$, $0 \leq b \leq 0.5$, $0 \leq c \leq 0.05$, and $0 < \alpha \leq 2$; $Li_aNi_{1-b-c}Co_bD_cO_{2-\alpha}J_\alpha$ wherein, in $Li_aNi_{1-b-c}Co_bD_cO_{2-\alpha}J_\alpha$, $0.90 \leq a \leq 1.8$, $0 \leq b \leq 0.5$, $0 \leq c \leq 0.05$, and $0 < \alpha < 2$; $Li_aNi_{1-b-c}Co_bD_cO_{2-\alpha}J_2$ wherein, in $Li_aNi_{1-b-c}Co_bD_cO_{2-\alpha}J_2$, $0.9 \leq a \leq 1.8$, $0 \leq b \leq 0.5$, $0 \leq c \leq 0.05$, and $0 < \alpha < 2$; $Li_aNi_{1-b-c}Mn_bD_cE_\alpha$ wherein, in $Li_aNi_{1-b-c}Mn_bD_cE_\alpha$, $0.90 \leq a \leq 1.8$, $0 \leq b \leq 0.5$, $0 \leq c \leq 0.05$, and $0 < \alpha \leq 2$; $Li_aNi_{1-b-c}Mn_bD_cO_{2-\alpha}J_\alpha$ wherein, in $Li_aNi_{1-b-c}Mn_bD_cO_{2-\alpha}J_\alpha$, $0.90 \leq a \leq 1.8$, $0 \leq b \leq 0.5$, $0 \leq c \leq 0.05$, and $0 < \alpha < 2$; $Li_aNi_{1-b-c}Mn_bD_cO_{2-\alpha}J_2$ wherein, in $Li_aNi_{1-b-c}Mn_bD_cO_{2-\alpha}J_2$, $0.90 \leq a \leq 1.8$, $0 \leq b \leq 0.5$, $0 \leq c \leq 0.05$, and $0 < \alpha < 2$; $Li_aNi_bG_cL_dO_2$ wherein, in $Li_aNi_bG_cL_dO_2$, $0.90 \leq a \leq 1.8$, $0 \leq b \leq 0.9$, $0 \leq c \leq 0.05$, and $0.001 \leq d \leq 0.2$; $Li_aNi_bG_cO_2$ wherein, in $Li_aNi_bG_cO_2$, $0.90 \leq a \leq 1.8$, $0 \leq b \leq 0.9$, and $0 \leq c \leq 0.5$, and $Li_aNi_bCo_cMn_dL_eO_2$ wherein, in $Li_aNi_bCo_cMn_dL_eO_2$, $0.90 \leq a \leq 1.8$, $0 \leq b \leq 0.9$, $0 \leq c \leq 0.5$, $0 \leq d \leq 0.5$, and $0.001 \leq e \leq 0.2$; $Li_aNi_bCo_cMn_dO_2$ wherein, in $Li_aNi_bCo_cMn_dO_2$, $0.90 \leq a \leq 1.8$, $0 \leq b \leq 0.9$, $0 \leq c \leq 0.5$, and $0 \leq d \leq 0.5$; $Li_aNiL_bO_2$ wherein, in $Li_aNiL_bO_2$, $0.90 \leq a \leq 1.8$, and $0.001 \leq b \leq 0.2$; $Li_aCoL_bO_2$ wherein, in $Li_aCoL_bO_2$, $0.90 \leq a \leq 1.8$, and $0.001 \leq b \leq 0.2$; $Li_aMnL_bO_2$ wherein, in $Li_aMnL_bO_2$, $0.90 \leq a \leq 1.8$, and $0.001 \leq b \leq 0.2$; $Li_aMn_2L_bO_4$ wherein, in $Li_aMn_2L_bO_4$, $0.90 \leq a \leq 1.8$, and $0.001 \leq b \leq 0.2$; $Li_aMn_2O_4$ wherein, in $Li_aMn_2O_4$, $0.9 \leq a \leq 1.8$; $MO_2$; $MS_2$; $LiMS_2$; $V_2O_5$; $LiV_2O_5$; $LiQO_4$; $LiNiVO_4$; $Li_{(3-f)}T_2(PO_4)_3$ wherein, in $LiNiVO_4$; $Li_{(3-f)}T_2(PO_4)_3$, $0 \leq f \leq 2$; $Li_{(3-f)}Fe_2(PO_4)_3$ wherein, in $Li_{(3-f)}Fe_2(PO_4)_3$, $0 \leq f \leq 2$; and $LiFePO_4$, wherein in the above chemical formulae, A is selected from the group consisting of Ni, Co, Mn, and combinations thereof, D is selected from the group consisting of Al, Ni, Co, Mn, Cr, Fe, Mg, Sr, V, a rare earth element, and combinations thereof, E is selected from the group consisting of O, F, S, P, and combinations thereof, G is selected from the group consisting of Co, Mn, and combinations thereof, J is selected from the group consisting of F, S, P, and combinations thereof, L is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, and combinations thereof, M is selected from the group consisting of Ti, Mo, Mn, and combinations thereof, Q is selected from the group consisting of Cr, V, Fe, Sc, Ti, Y, and combinations thereof, and T is selected from the group consisting of V, Cr, Mn, Co, Ni, Cu, and combinations thereof.

5. The rechargeable lithium battery of claim 4, wherein the positive active material is $LiCoO_2$.

6. The rechargeable lithium battery of claim 3, wherein the negative active material is $SiO_x$ wherein, in $SiO_x$, $0<x<2$.

7. The rechargeable lithium battery of claim 3, wherein the negative active material is $SiO_x$ coated with carbon wherein, in $SiO_x$, $0<x<2$.

8. The rechargeable lithium battery of claim 3, wherein the rechargeable lithium battery has a charge voltage between 4.3V and 4.5 V.

9. A method of preparing an electrolyte for a rechargeable lithium battery, the method comprising:
  forming an electrolyte additive mixture; and
  adding a lithium salt and the electrolyte additive mixture to a non-aqueous organic solvent to form the electrolyte,
  wherein the electrolyte additive mixture comprises 2 to 6 wt % of succinonitrile, 2 to 6 wt % of a sultone, and 1 to 3 wt % of vinylethylene carbonate based on the total weight of the electrolyte, and wherein the sultone is selected from the group consisting of 1,3-propanesultone, butane sultone, 1,3-(1-propene sultone), and combinations thereof.

10. The method of claim 9, wherein the electrolyte additive mixture comprises 35 to 300 parts by weight of the sultone and 20 to 150 parts by weight of the vinylethylene carbonate based on 100 parts by weight of the succinonitrile.

* * * * *